Nov. 1, 1949  S. S. BOWEN  2,486,918
LOW LIFT JACK
Filed Aug. 13, 1946
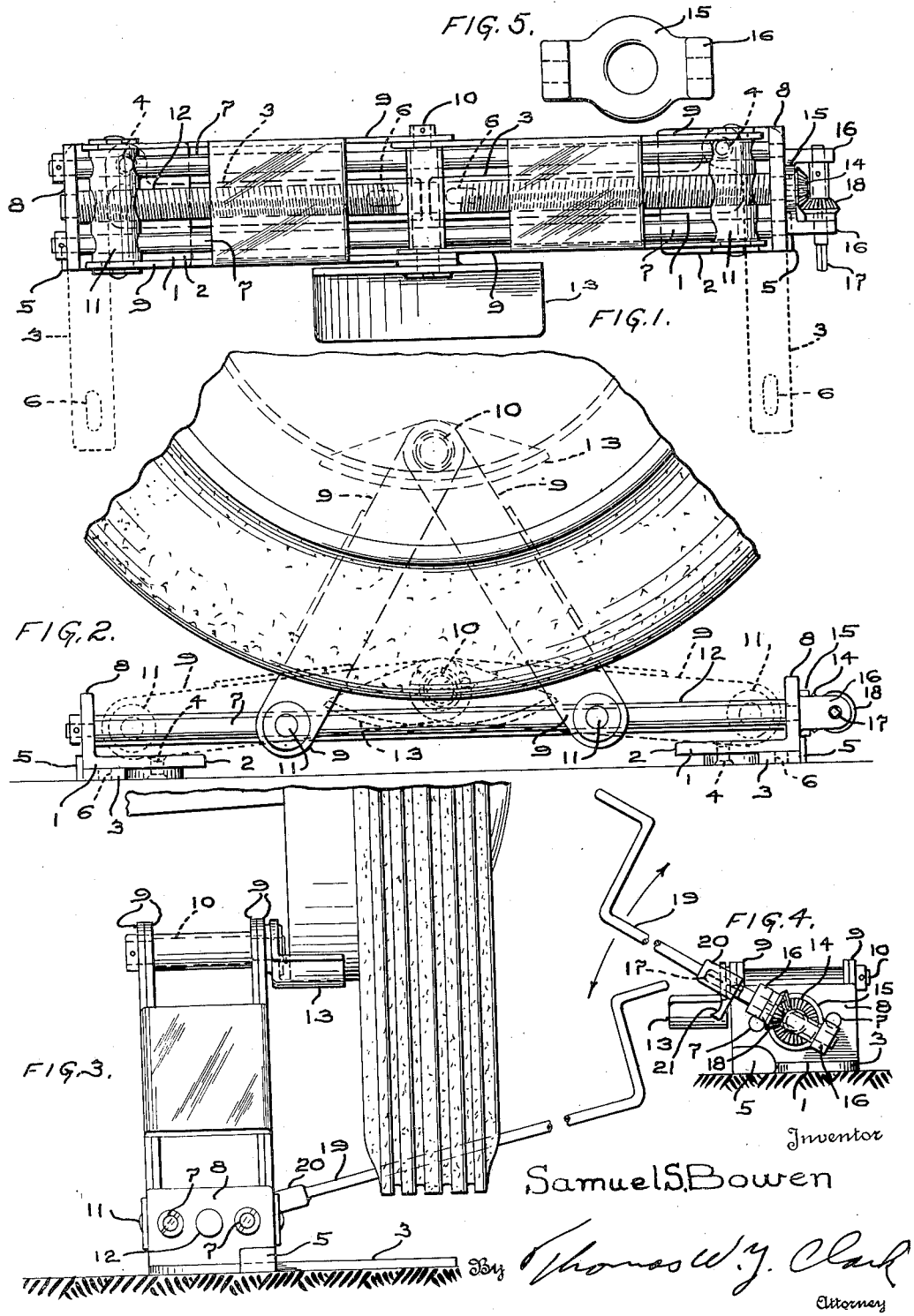
Inventor
Samuel S. Bowen
By Thomas W. J. Clark
Attorney Patented Nov. 1, 1949

2,486,918

UNITED STATES PATENT OFFICE 2,486,918

LOW LIFT JACK

Samuel S. Bowen, Owings Mills, Md.

Application August 13, 1946, Serial No. 690,213

2 Claims. (Cl. 254—126)

This invention relates to a jack particularly for use for automobiles having individually suspended wheels.

The lifting element of the jack of this invention comes so near to the ground that even though the tire has been deflated, that lifting element can reach under the brake drum on the wheel and raise it so that the tire may be replaced by another. Another object of the invention is to make a jack that could be readily handled by an individual from the side of the automobile without the necessity of getting under the automobile so that one would not soil his clothes in properly placing the jack. The jack is economically constructed and very easy to operate and the parts fold to a compact position so that the jack may be readily carried in the automobile.

Other objects and advantages of the jack will be apparent from the following description and the accompanying drawings forming a part hereof and in which:

Figure 1 is a top plan view of the jack folded.

Figure 2 is a side elevation of the jack in wheel lifting position.

Figure 2 is an end elevation of the jack in similar position.

Figure 4 is an end elevation of the jack folded, showing the operating crank.

Figure 5 is an end elevation of the yoke holding the gearing.

In the drawings similar numerals refer to similar parts throughout the views.

The jack has two similar spaced platforms 1. These platforms have a base member 2 on the bottom of which are horizontally pivoted feet 3. These feet are L-shaped members as best shown in Figure 1 in folded position. They are pivoted at 4 to the side of the platform away from their direction of extension when extended. They are shown extended in the dotted lines in Figure 1 and in solid lines in Figure 3. Stops 5 may be placed at the ends of each platform to limit the outward swing of the adjacent foot. Each foot has a hole 6 in its extending end.

The platforms are connected together by rods 7 fixedly attached to the upstanding ends 8 of each platform. Levers 9 are pivoted together at their center by rod 10 and they are in turn at their extended ends pivoted to slides 11 which have holes therein on which they slide on rods 7. These slides 11 are threaded to receive screw 12 which is oppositely threaded at each end so that its rotation in one direction will raise the levers 9 simultaneously by drawing the extended ends together, and in the other direction will extend the levers to a nearly straight or flat position. The rod 10 when in contact with the screw 12 prevents the complete flattening of the levers so that they never reach a dead center. When the rod 10 is in contact with the screw 12 the jack is in its lowest position near the ground. To the side of the rod 10 in the direction in which the feet extend, a saddle or cradle 13 is attached. This saddle is designed to fit exactly under the drum of the brake on an individually suspended wheel of an automobile and it will go very near the ground to reach under this drum even when the tire is deflated.

The screw 12 is rotated through gear 14 on its end, which end first passes through the base of yoke 15. Outwardly projecting arms 16 of the yoke have passing therethrough shaft 17 on which is gear 18 meshing with gear 14. The yoke 15 is allowed to pivot around screw 12 so that the operator in turning crank 19 having a socket 20 thereon fitting over the squared end of shaft 17 may rotate the crank from various heights.

The openings 6 in feet 3 receive hook 21 on the end of crank 19 so that the feet can be pulled into position by means of the hook 21 in case it is not convenient to simply slide the jack in place by using crank 19. This sliding operation can conveniently be carried out on a smooth floor but on rough ground one may need to grip the ends of feet 3 firmly to pull them forward so that the saddle 13 is directly under the brake drum of the wheel, should there be slight longitudinal misalignment of the jack and saddle with the center of the drum, the saddle will swing on its pivot if it is in contact with the drum and raise it.

From the above description it will be apparent that the center of gravity of the lift is to one side of the main portion of body of the jack and therefore the feet 3 must extend outwardly under the wheel as shown in Figure 3 to properly balance that center of gravity and prevent the tipping of the elevated jack. These feet 3 may be folded back longitudinally of the jack as shown in Figure 1 and crank 19 may be detached from shaft 17, so that the whole jack can be conveniently carried in the tool compartment or trunk of the ordinary automobile.

It will be apparent that many modifications may be made in the structure illustrated without departing from the invention as defined in the following claims.

What is claimed as new and is desired to be secured by Letters Patent is:

1. A jack for lifting an automobile wheel from the ground, comprising two spaced platforms, a plurality of parallel rods extending between and rigidly connecting said platforms together, a pair of transverse centrally threaded slides mounted cross-wise of and slidable on said rods, a screw reversely threaded from each end in the threaded slides, which screw upon turning, moves the slides back and forth along the rods, two pairs of spaced lifting levers, each pair being extended and mounted at their extended ends on the ends of said slides, a transverse rod passing through and hingedly connecting the other ends of the pairs of levers, a saddle pivoted to swing freely on one end of said transverse rod and projecting laterally from said levers, said saddle comprising a wheel brake-drum support, feet extending laterally from each platform in the direction of the saddle, and means to turn the screw to contract the levers to raise the saddle.

2. The lifting jack of claim 1 in which the feet are hinged on the platforms to swing in a horizontal plane from their lateral position, to a position substantially parallel with said screw, to fold them under the jack when not in use.

SAMUEL S. BOWEN.

REFERENCES CITED

The following references are of record in the file of this patent:

UNITED STATES PATENTS

| Number | Name | Date |
|---|---|---|
| 1,782,313 | Poehls | Nov. 18, 1930 |
| 2,182,705 | Rissane | Dec. 5, 1939 |
| 2,271,586 | Gerich | Feb. 3, 1942 |

FOREIGN PATENTS

| Number | Country | Date |
|---|---|---|
| 41,355 | France | Oct. 11, 1932 |